(12) United States Patent
Büttner

(10) Patent No.: US 9,167,838 B2
(45) Date of Patent: Oct. 27, 2015

(54) INFANT FORMULATION CONTAINING AN AROMA COMPOSITION FOR USE AS FRAGRANCE

(75) Inventor: Andrea Büttner, München (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 1042 days.

(21) Appl. No.: 12/451,428

(22) PCT Filed: May 8, 2008

(86) PCT No.: PCT/EP2008/003721
§ 371 (c)(1), (2), (4) Date: Nov. 12, 2009

(87) PCT Pub. No.: WO2008/138547
PCT Pub. Date: Nov. 20, 2008

(65) Prior Publication Data
US 2010/0129312 A1    May 27, 2010

(30) Foreign Application Priority Data
May 11, 2007    (EP) .................... 07009549

(51) Int. Cl.
*A23L 1/29* (2006.01)
*A47G 9/00* (2006.01)
*C11B 9/00* (2006.01)

(52) U.S. Cl.
CPC ................. *A23L 1/296* (2013.01); *A47G 9/007* (2013.01); *C11B 9/0011* (2013.01); *C11B 9/0015* (2013.01); *C11B 9/0019* (2013.01); *C11B 9/0034* (2013.01); *C11B 9/0042* (2013.01); *C11B 9/0061* (2013.01); *C11B 9/0076* (2013.01); *C11B 9/0092* (2013.01)

(58) Field of Classification Search
CPC .... A23L 1/296; C11B 9/0011; C11B 9/0015; C11B 9/0019; C11B 9/0034; C11B 9/0042; C11B 9/0061; C11B 9/0076; C11B 9/0092; A61K 31/568
See application file for complete search history.

(56) References Cited

U.S. PATENT DOCUMENTS

| | | | |
|---|---|---|---|
| 3,924,014 A | 12/1975 | Ney et al. | |
| 4,488,973 A | 12/1984 | Hill et al. | |
| 5,260,084 A | * 11/1993 | Nixon | 426/580 |
| 5,272,134 A | * 12/1993 | Berliner | 512/3 |
| 5,278,141 A | * 1/1994 | Berliner | 512/3 |
| 2004/0091599 A1 | 5/2004 | Theuer et al. | |
| 2005/0261738 A1 | 11/2005 | Garrett | |

FOREIGN PATENT DOCUMENTS

| | | |
|---|---|---|
| DE | 2057906 | 6/1972 |
| DE | 19941915 A1 | 3/2000 |
| EP | 0206739 A2 | 6/1986 |
| EP | 0298552 A1 | 1/1989 |
| EP | 0938851 A1 | 9/1999 |
| EP | 1728496 A2 | 12/2006 |
| GB | 1227243 | 4/1971 |
| GB | 1439882 | 6/1976 |
| WO | 9409646 A1 | 5/1994 |
| WO | WO97/30687 | 8/1997 |
| WO | 9805220 A1 | 2/1998 |
| WO | WO99/37270 | 7/1999 |
| WO | 0139614 A1 | 6/2001 |
| WO | 03007725 A2 | 1/2003 |
| WO | WO2006/079171 | 8/2006 |
| WO | 2007033508 A2 | 3/2007 |
| WO | WO2008/138547 | 11/2008 |

OTHER PUBLICATIONS

Garcia-Llatas et al. A headspace solid-phase microextraction method of use in monitoring hexanal and pentane during storage: Application to liquid infant foods and powdered infant formulas. Food Chemistry 101 (2006) 1078-1086.*
Shimoda et al. Volatile compounds of human milk. J. Fac. Agr, Kyushu Univ., 45 (1), 199-206 (2000).*
Bingham et al. Odorants in breast milk. Arch Pediatr Adolesc Med. Oct. 2003;157(10): 1031.*
Buettner, Andrea. "A selective and sensitive approach to characterize odour-active and volatile constituents in small-scale human milk samples." Flavour and Fragrance Journal 22.6 (2007): 465-473.*
Handbook of Pharmaceutical Excipients. Pharmaceutical Press 2009 (6th Edition) 129-133.*
Huet R., "The Aroma of Passion Fruit Juice", Database FSTA [online] International Food Information Service (IFIS), Database Accession No. FS-1973-11-J-1753, vol. 28, No. 5, p. 397, Fruits 1973 IFAC, Frankfurt-Main, DE, 6 Rue Du General Clergerie, 75116, Paris France, English abstract only.
Michael Czerny et al., "Influence of the Polyethylene Packaging on the Adsorption of our Odour-Active Compounds from UHT-Milk", European Food Research and Technology, vol. 225, No. 2, Jun. 23, 2006, pp. 215-223, XP019512375, ISSN: 1438-2385, Zeitschrift fur Lebensmitteluntersuchung und—Forschung A. Springer, Berlin.
Budin J. et al., 1996 IFT Annual Meeting: Book of Abstracts, Potent Odorants of Fresh and Heated Sweet Cream Butter, Database FSTA [online] International Food Information Service (IFIS), Database Accession No. FS-1997-01-P-0130, 1996, Frankfurt-Main, DE, Department of Food Science & Nutrition, University of Minnesota, St. Paul, Minnesota, English abstract only.

(Continued)

*Primary Examiner* — Bethany Barham
*Assistant Examiner* — Peter Anthopolos
(74) *Attorney, Agent, or Firm* — Warn Partners, P.C.

(57) ABSTRACT

The invention relates to a nutraceutical composition such as infant formula or infant food comprising a) a defined aroma composition; b) a methodology for developing, maintaining certain aroma constituents in the infant formula and an aroma or fragrance composition to be used to increase the acceptance of a person or an object by the baby or new born.

3 Claims, No Drawings

(56) References Cited

OTHER PUBLICATIONS

Lucia Castro-Vazquez et al., "Volatile Composition and Contribution to the Aroma of Spanish Honeydew Honeys. Identification of a New Chemical Marker", Journal of Agricultural and Food Chemistry, vol. 54, No. 13, pp. 4809-4813, XP55016243, ISSN: 0021-8561, DOI: 10.1021/jf0604384, Jun. 2006.

Salles C. et al., "Goat Cheese Flavor: Sensory Evaluation of Branched-Chain Fatty Acids and Small Peptides", Journal of Food Science, vol. 67, No. 2, pp. 835-841, XP001189432, ISSN: 0022-1147, DOI: 10.1111/J.1365-2621.2002.TB10686.X, Mar. 1, 2002, Wiley-Blackwell Publishing, ICN. US.

Raymond H. Thompson et al., Quantitative Determination of 5-alpha-Androst-16-en-3-one by Gas Chromatography-Mass Spectrometry and its Relationship to Sex Odor Intensity of Pork, Journal of Agricultural and Food Chemistry, pp. 1241-1245, XP55016743, Retrieved from the Internet: URL:http://pubs.acs.org/doi/pdf/10.1021/jf60214a033, Jan. 1, 1977.

Brooks R. et al., "Odor Thresholds of the C-19-delta-16 Steroids Responsible for Boar Odor in Pork", Database Biosis [online] Bioscience Information Service, Database Accession No. PREV198988037230, 1989, Philadelphia, PA, US & Meat Science, vol. 25, No. 1, pp. 11-20, ISSN:0309-1740, 1989, English abstract only.

Database WPI, Week 200543, Thomson Scientific, London, GB; AN 2005-421009 & JP 2005-143467 A (Kawasaki) 9, Jun. 9, 2005, English abstract only.

S. Giammarioli, G. Bellomonte, M. Denaro & M.R. Milana, Determination of Hexanal in Infant Formulas by Headspace-Gas Chromatography, Italian Journal of Food Science, 1995, pp. 69-76, No. 1.

Kelly M. Jackson & Andrea M. Nazar, Breastfeeding, the Immune Response, and Long-term Health, JAOA, Apr. 2006, pp. 203-207, vol. 106, No. k4, West Virginia School of Osteopathic Medicine and the Robert C. Byrd Clinic.

J. Bruce German, Cora J. Dillard & Robert E. Ward, Bioactive Components in Milk, Curr. Opin. Clin Nutr. Metab Care, 2002, pp. 653-658, Lippincott Williams & Wilkins.

Jennifer W. Makin & Richard H. Porter, Attractiveness of Lactating Females' Breast Odors to Neonates, Society for Research in Child Development, Inc., 1989, pp. 803-810, vol. 60, Vanderbilt University.

Luc Marlier, Benoist, & Robert Soussignan, Orientation responses to biological odours in the human newborn. Initial pattern and postnatal plasticity, C.R. Acad. Sci. Paris, 1997, pp. 999-1005, vol. 320.

Luc Marlier & Benoist Schaal, Human Newborns Prefer Human Milk: Conspecific Milk Odor is Attractive Without Postnatal Exposure, Society for Research in Child Development, Inc., k2005, pp. 155-168, vol. 76, No. 1.

Bo Lonnerdai, PhD, Breast Milk: A Truly Functional Food, Department of Nutrition and Program of International Nutrition at University of California, 2000, pp. 509-511, vol. 16, Nos. 7/8.

Julie A. Mennella, PhD & Gary K. Beauchamp, PhD, Maternal Diet Alters the Sensory Qualities of Human Milk and the Nursling's Behavior, Monell Chemical Senses Center, Oct. 1991, pp. 737-744, vol. 88, No. 4.

J.A. Mennella & G.K. Beauchamp, Mothers' Milk Enhances the Acceptance of Cereal during Weaning, Monell Chemical Senses Center, 1997, pp. 188-192, vol. 41.

Julie A. Mennella, Coren P. Jagnow & Gary K. Beauchamp, Prenatal and Postnatal Flavor Learning by Human Infants, American Academy of Pediatrics, 2001, pp. 1-6, vol. 107, [retrieved online Dec. 17, 2012] pediatrics.aappublications.org.

Julie A. Mennalla, Cara E. Griffin & Gary K. Beauchamp, Flavor Programming During Infancy, American Academy of Pediatrics, 2004, pp. 840-845, vol. 113, [retrieved online Dec. 17, 2012] pediatrics.aappublications.org.

Richard H. Porter, Jennifer W. Makin, Linda B. Davis & Katherine M. Christensen, An Assessment of the Salient Olfactory Environment of Formula-Fed Infants, Physiology & Behavior, 1991, pp. 907-911, vol. 50, Department of Psychology and Human Development George Peabody College of Vanderbilt University, Nashville, Tennessee.

Robert Soussignan, Benoist Schaal, Luc Marlier & Tao Jiang, Facial and Autonomic Responses to Biological and Artificial Olfactory Stimuli in Human Neonates: Re-Examining Early Hedonic Discrimination of Odors, Physiology & Behavior, 1997, pp. 745-758, vol. 62, No. 4, Elsevier Science Inc.

K. R. Christensen & G.A. Reineccius, Gas Chromatographic Analysis of Volatile Sulfur Compounds from Heated Milk Using Static Headspace Sampling, J. Dairy Science, 1992, pp. 2098-2104, Department of Food Science and Nutrition at University of Minnesota.

P. A. Vazquez-Landaverde, G. Velazquez, J. A. Torres & M. C. Qian, Quantitative Determination of Thermally Derived Off-Flavor Compounds in milk Using Solid-Phase Microextraction and Gas Chromatography, American Dairy Science Association, 2005, pp. 3764-3772, vol. 88, Department of Food Science and Technology, Oregon State University.

M. A. Weidong, B. A. Clement, & W. R. Klemm, Volatile Compounds of Bovine Milk as Related to the Stage of the Estrous Cycle, J. Dairy Science, 1997, pp. 3227-3233, vol. 80, Department of Veterinary Anatomy and Public Health, Texas A&M University.

Luigi Moio, Jocelyne Dekimpe, Patrick Etievant & Francesco Addeo, Neutral Volatile Compounds in the Raw Milks from Different Species, Journal of Diary Research, 1993, pp. 199-213, vol. 60.

Luigi Moio, Dominique Langlois, Patrick Etievant & Francesco Addeo, Powerful Odorants in bovine, ovine, caprine and water buffalo milk determined by means of gas chromatography-olfactometry, Journal of Dairy Research, 1993, pp. 215-222, vol. 60.

L. Moio, J. Dekimpe, P.X. Etievant & F. Addeo, The Neutral Volatile Compounds of Water Buffalo Milk, Italian Journal of Food Science, 1993, pp. 43-56, No. 1.

L. Moio, L. Rillo, A Ledda & F. Addeo, Odorous Constituents of Ovine Milk in Relationship to Diet, Journal Dairy Science, 1996, pp. 1322-1331, vol. 79.

N. Ramaswamy, R. J. Baer, D. J. Schingoethe, A. R. Hippen, K.M. Kasperson & L.A. Whitlock, Composition and Flavor of Milk and Butter from Cows, Fed Fish Oil, Extruded Soybeans, or Their Combination, American Diary Science Association, 2001, pp. 2144-2151, vol. 84, Minnesota-South Dakota Dairy Foods Research Center, Dairy Science Department, South Dakota State University Michel Desage, Benoist Schaal, Jacqueline Soubeyrand, Pierre Orgeur & Jean-Louis Brazier, Gas Chromatographic-Mass Spectrometric Method to Characterise the Transfer of Dietary Odorous Compounds into Plasma and Milk, Journal of Chromatograpy B: Biomedical Applications, 1996, pp. 205-210, vol. 678, Elsevier Science B.V.

Katharina M. Main, Gerda K. Mortensen. Marko M. Kaleva, Kirsten A. Boisen, Ida N. Damgaard, Maria Chellakotty, Ida M. Schmidt, Anne-Maarit Suomi, Helena E. Virtanen, Jorgen H. Petersen, Anna-Maria Anderson, Jorma Toppari & Niels E. Skakkebaek, Human Breast Milk Comtamination with Phthalates and Alterations of Endogenous Reproductive Hormones in Infants Three Months of Age, Environment Health Perspectives, Feb. 2006, pp. 270-273, vol. 114, No. 2.

Jenny Pronczuk, James Akre, Gerald Moy & Constanza Vallenas, Global Perspectives in Breast Milk Contamination: Infectious and Toxic Hazards, Environmental Health Perspectives, Jun. 2002, pp. A 349-A 351, vol. 110, No. 6.

Erik Baltussen, Pat Sandra, Frank David & Carel Cramers, Stir Bar Sorptive Extraction (SBSE), a Novel Extraction Technique for Aqueous Samples: Theory and Principles, J. Microcolumn Separations, 1999, pp. 737-747, vol. 11(10), John Wiley & Sons, Inc.

Jordy Vercauteren, Christophe Peres, Christophe Devos, Pat Sandra, Frank Vanhaecke & Luc Moens, Stir Bar Sorptive Extraction for the Determination of ppq-Level Traces of Organotin Compounds in Environmental Samples with Thermal Desorption-Capillary Gas Chromatography-ICP Mass Spectrometry, Analytical Chemistry, Apr. 1, 2001, pp. 1509-1514, vol. 73, No. 7.

Peter Popp, Coretta Bauer & Luise Wennrich, Application of Stir Bar Sorptive Extraction in Combination with Column Liquid Chromatography for the Determination of Polycyclic Aromatic Hydrocarbons in Water Samples Analytica Chimica ACTA, 2001, pp. 1-9, vol. 436, Elsevier Science B.V.

(56) References Cited

OTHER PUBLICATIONS

Andrea G.J. Tredoux, Henk H. Lauer, Theo Heideman & Pat Sandra, The Determination of Benzoic Acid in Lemon Flavored Beverages by Stir Bar Sorptive Extraction-CGC-MS, J. High Resol. Chromatography, 2000, pp. 644-646, vol. 23, Wiley-VCH Verlag GmbH.

Pat Sandra, Bart Tienpont, Joeri Vercammen, Andreas Tredoux, Tom Sandra & Frank David, Stir Bar Sorptive Extraction Applied to the Determination of Dicarboximide Fungicides in Wine, Journal of Chromatography, 2001, pp. 117-126, vol. A. 928, Elsevier Science B.V.

Mirjam Kreck, Susen Puschel, Matthias Wust & Armin Mosandl, Biogenetic Studies in Syringa Vulgaris L.: Synthesis and Bioconversion of Deuterium-Labeled Precursors into Lilac Aldehydes and Lilac Alcohols, Journal of Agriculture Food Chemistry, 2003, pp. 463-469, vol. 51, American Chemical Society.

Carlo Bicchi, Christina Iori, Patrizia Rubiolo & Pat Sandra, Headspace Sorptive Extraction (HSSE), Stir Bar Sorptive Extraction (SBSE), and Solid Phase Microextraction (SPME) Applied to the Analysis of Roasted Arabica Coffee and Coffee Brew, Journal of Agriculture and Food Chemistry, 2002, pp. 449-459, vol. 50, American Chemical Society.

Sadao Nakamura, Naomi Nakamura & Satoshi Ito, Determination of 2-methylisoborneol and Geosmin in Water by Gas Chromatograpy-mass Spectrometry Using Stir Bar Sorptive Extraction, Journal Separation Science, 2001, pp. 674-677, vol. 24, Wiley-VCH Verlag GmbH.

Nobuo Ochiai, Kikuo Sasamoto, Masahiko Takino, Satoru Yamashita, Shigeki Daishima, Arnd Heiden & Andreas Hoffman, Determination of Trace Amounts of Off-Flavor Compounds in Drinking Water by Stir Bar Sorptive Extraction and Thermal Desorption GC-MS, Journal of The Royal Society of Chemistry, 2001, pp. 1652-1657, vol. 126.

Mirjam Kreck, Annette Scharrer, Steffi Bilke & Armin Mosandl, Stir Bar Sorptive Extraction (SBSE)-enantio-MDGS-MS- a Rapid Method for the Enantioselective Analysis of Chiral Flavour Compounds in Strawberries, Eur. Food Res. Technology, 2001, pp. 389-394, vol. 213

Tom Benijts, Joeri Vercammen, Riet Dams, Hai Pham Tuan, Wily Lambert & Pat Sandra, Stir Bar Sorptive Extraction—Thermal Desorption—Capillary Gas Chromatography—Mass Spectrometry Applied to the Analysis of Polychlorinated Biophenyls in Human Sperm, Journal of Chromatography B, 2001, pp. 137-142, vol. 755, Elsevier Science B.V.

B. Tienpont, F. David, K. Desmet & Pat Sandra, Stir Bar sorptive Extraction-Thermal Desorption-Capillary GC-MS applied to Biological Fluids, Anal Bioanal Chemistry, 2002, pp. 46-55, vol. 373.

A. Buettner, Hoffman T., Rothe T., Schieberle P., Investigation of Espresso—"Aftersmell" by Use of the Buccal Odour Screening System (BOSS), State-of-the-Art in Flavour Chemistry and Biology, Proceedings of the 7th Wartburg Symposium on Flavor Chemistry & Biology, 2005, pp. 387-390.

Andrea Buettner, Investigation of Potent Odorants and Afterodor Development in Two Chardonnay Wines Using the Buccal Odor Screening System (BOSS), Journal of Agriculture Food Chemistry, 2004, pp. 2339-2346, vol. 52, American Chemical Society.

Wolfgang A. Halang, Rolph Langlais & Ernst Kugler, Cubic Spline Interpolation of the Calculation of Retention Indices in Temperature-Programmed Gas-Liquid Chromatography, Nov. 1978, pp. 1809-1832, vol. 50, No. 13, American Chemical Society.

Peter Schieberle & Werner Grosch, Potent Odorants of the Wheat Bread Crumb—Differences to the Crust and Effect of a Longer Dough Fermentation, Z. Lebensm Unters Forsch, 1991, pp. 130-135, vol. 192.

Imre Blank, Karl-Heinz Fisher & Werner Grosch, Intensive Neutral Odourants of Linden Honey—Differences from Honeys of other Botanical Origin, Original Papers, 1989, pp. 426-433, vol. 189.

Frank Ullrich & Werner Grosch, Identification of the Most Intense Odor Compounds Formed during Autoxidation of Methyl Linolenate at Room Temperature, JAOCS, Aug. 1988, pp. 1313-1317, vol. 65, No. 8.

Andrea Buettner & Peter Schieberle, Evaluation of Key Aroma Compounds in Hand-Squeezed Grapefruit Juice (Citrus paradisi Macfayden) by Quantitation and Flavor Reconstitution Experiments, Journal of Agriculture Food Chemistry, 2001, pp. 1358-1363, vol. 49, American Chemical Society.

E. Baltussen, C. A. Cramers & P. J. Sandra, Sorpotive sample preparation—a review, Anal Bioanal Chemistry, 2002, pp. 3-22, vol. 373.

Andra Buettner & Frank Welle, Intra-Oral Detection of Potent Odorants using a Modified Stir-Bar Sorptive Extraction System in Combination with HRGC-O, known as the Buccal Odour Screening System (BOSS), Flavour and Fragrance Journal, 2004, pp. 505-514, vol. 19, John Wiley & Sons, Ltd.

Key Aroma Compounds in Raw Materials, publication in German. English summary on p. 163-165.

Valerie Virginie Rota, Charakterisierung von Schlusselaromastoffen in rohem and kochketem Schaffleisch durch Anwendung von Struktur/Wirkungskonzepten, 2004, pp. 1-87, Verlag Dr. Hut, Munchen (Key Aroma Compounds in Raw Materials, publication in German with English Summary, pp. 163-165.

* cited by examiner

INFANT FORMULATION CONTAINING AN AROMA COMPOSITION FOR USE AS FRAGRANCE

This application is a National Stage of International Application No. PCT/EP2008/003721, filed May 8, 2008. This application claims priority to European Patent Application No. 07009549.2 filed on May 11, 2007. The disclosures of the above applications are incorporated herein by reference.

BACKGROUND OF THE INVENTION

Breast-feeding is believed to exhibit a series of advantages for the newborn compared to bottle-feeding. Human milk has been shown to impart several nutritional and health benefits, for example promotion of the infant's neuronal and intestinal development and fortification of the immune system 1, 2, 3. Apart from these aspects, many studies point out that human milk exhibits certain olfactory clues that foster the newborns' ability to orient themselves versus the human milk source 4, 5, 6, and that might even play an important role in the development of certain food preferences in later life 7, 8, 9, 10. Moreover, newborns are able to distinguish between human milk and cow's or artificial milk, they can separate between their own mother's Milk and that of other women, and are even able to distinguish between different types of human milk according to their individual temporal needs, that means between e.g. colostrum and mature human milk 4, 6, 11, 12. Even more interesting is that it was shown in these studies that babies prefer the odor attributes of human milk compared to those of artificial infant formula or milk products based on milk compositions of animal origin such as cow's milk etc. To date, most studies in the area of milk research dealt with the characterization of odor-active volatiles in processed animal milks, predominantly UHT or pasteurized milks 13, 14. From these, the conspecific odor compositions of the milks from for example cows, ewes, etc. cannot be deduced as odorants might be degraded during the heating and further processing steps, or might be formed as new and additional odor constituents. Several effects forming artificial non-natural flavor attributes in milk have been well-documented such as the sunlight-flavor etc. 13, 14.

On the other hand, there are some studies dealing with the identification and quantification of conspecific volatiles or odorants in fresh or raw animal milk 14. However, most of these studies are based on techniques such as gas chromatographic and mass spectrometric methodologies that do not allow any weighting of a possible sensory contribution of the respective compounds 15. Only a few studies targeted at the identification of odor-active substances in animal milk such as water buffalo and ewe's milk 16, 17, 18, 19. Among the most common volatiles were aldehydes, ketones, esters, lactones and several diverse substances such as terpenes and aromatic compounds.

Also, as for human milk, the influence of mother's diet on the milk odor profile compositions is not yet understood. For cow's milk and ewe's milk, there are a few studies characterizing the changes of milk odor profiles with regard to specific feeding regimes, but in most cases just on a sensory, not on a chemical-analytical basis 19, 20, 21.

While there is numerous evidence on the psychophysics level that human milk displays a very characteristic and individual olfactory composition, the molecular principles behind these phenomena remained relatively unclear. This was predominantly due to the fact that, on the one hand, sample size is very limited for comprehensive investigation of the odor composition and of the odor-dynamics of human milk in relation to single breastfeeding episodes. On the other hand, the commonly used techniques for odor analysis of human milk such as solvent extraction techniques or gas chromatographic analysis in coupling with mass spectrometry or flame ionization detection were very limited with regard to odor specificity.

This might be regarded as the main reason that only limited data on the chemical characterization of odor-active compounds in human milk is available to date 22. In this cited study, authors succeeded in identifying a total of five odorants which were detectable in all four analyzed breast milk samples. These compounds were the fatty-tallowy smelling (E)non-2-enal, the mushroom-like smelling oct-1-en-3-one, the caramel-like compounds 4-hydroxy-2,5-dimethyl-3(2H)-furanone and maltol, and the milky smelling 2-nonanone. All of these compounds were also detectable in formula milk. On the other hand, some additional compounds were identified in formula milk: the buttery smelling butane-2,3-dione, the cooked potato-like smelling 3-methylthio propanal (methional) and the meat-like smelling 2-methyl-3-furanthiol. In conclusion, no human milk-specific compound has been reported in this study. A second study reported a series of volatiles in human milk, with 6 esters, 13 ketones, 6 fatty acids, 2 lactones, 24 aliphatic aldehydes, 9 alcohols, 18 hydrocarbons, and 6 miscellaneous compounds 23. Authors used an isolation procedure based on simultaneous steam distillation-extraction under reduced pressure using diethyl ether as the solvent with a distillation temperature of 62 to 65° C. during two hours of extraction. Detection and identification of the volatile compounds was accomplished by means of gas chromatography combined with mass spectrometry based on comparison of mass spectral data with library MS spectra. However, in the cited study, the sensory properties and the sensory contribution or impact of the identified compounds with regard to human milk was not elucidated. Moreover, the list of detected volatiles comprises a series of substances which are, to the specialist of the field of odor research, highly unlikely to be odor-active contributors of human milk, for example toluene, n-propylbenzene, 1,2,4-trimethylbenzene, m-, p- and o-ethyltoluene, 1H-pyrrole, N-butyl-N-nitrosobutanamine, N,N-dibutylformamide etc. Identification of such volatiles is more likely to be produced either by artifacts, by drawbacks of the analytical outline (identification by comparison with mass spectra library data only) or by environmental contaminations of the human milk as it has been described in different aspects 24, 25. In conclusion, it seems highly improbable that these substances are natural human milk odor constituents that are supposed to compose the human milk aroma attributes. This is supported by the aspect that there are no common biochemical routes known that would explain the occurrence of such substances in human milk as endogenous compounds. In addition, it is not clear whether some of the given volatiles have been generated due to the thermal treatment during the analytical procedure as specified above, or have been destroyed. Therefore, it is not possible to identify potential odor contributors for human milk aroma among the identified volatiles presented in the cited study, and to rate their possible impact and contribution to human milk aroma.

So far the addition of natural odorants of human milk for improving the acceptance of nutraceutical compositions has not been described.

In order to find an optimal infant formula, wherein the amounts and composition of the odor-active substances are as close as possible to mother's milk, the present inventor has studied the odor composition of fresh human milk by appropriate analytical tools without thermal exposition, predominantly taking into account the aspect of odor-activity. The analytical approach comprising gas chromatographic-olfactometric characterization of the odor volatiles was used that allowed the unambiguous identification of odor-active compounds even in small-scale human milk samples.

This approach offers the possibility to analyze milk from individual donors with minimal disturbance of the normal breast feeding procedure, and without the need to pool samples from a number of donors, as it was done in other studies. Also, the technique allows the analysis of separate individual milk sample portions from within one feeding session. That means the target was to develop an approach that allowed collection of a small portion of milk right at the beginning of the feeding episode, followed by one or more additional sampling events later on during the same feeding episode.

To achieve this goal, a very versatile and sensitive extraction technique for gaseous and liquid samples, the stir bar sorptive extraction (SBSE) was used 26. In SBSE, a PDMS-coated stir bar is exposed for a certain extraction time to a certain volume of sample either with or without preliminary application of derivatization techniques. After sorption of the analytes into the PDMS material, and removal of the matrix system, the analytes can be easily recovered via solvent extraction or thermo-desorption, and analyzed for example by means of high resolution-gas chromatography or liquid chromatography in combination with the respective detector systems. Compared to other sorptive sample preparation techniques such as SPME, the SBSE has several advantages such as convenient handling, high extraction capacity, very low amounts of PDMS breakdown products and many more 27. Apart from environmental investigations such as pesticide analysis and several others 27, 28, 29, first applications of SBSE have been reported for the direct analysis of e.g. benzoic acid or dicarboximide fungicides in foods and beverages 30, 31, for the elucidation of biochemical pathways, and for the analysis of odorous compounds in foods, mainly liquids 33, 34, 35. Combination with multidimensional gas chromatography using chiral chromatography systems allowed the assignment of the stereochemistry of aroma compounds in foods such as strawberries 36. In-vitro studies of biological markers, drugs, their metabolites or other artificial contaminants such as PCBs have been just recently performed on body fluids such as sperm, blood and urine 37, 38. Recently, SBSE was used in the context of a new in-vivo approach called BOSS (Buccal Odor Screening System) 39, 40. It was successfully applied for the characterization of volatile coffee and wine aroma "aftertaste" substances within the oral cavity. A variation of the system was applied to monitor the development of breath odor profiles after consumption of beer 43. The use in milk has not been described. An adopted approach for characterization of human milk odorants will be presented in the following.

Trace volatile and odorous substances that were characterized in fresh human milk with regard to their molecular composition and their sensory characteristics. The methodology was successfully applied for identification of more than forty characteristic odorants in human milk. The technique comprises a modified stir bar sorptive extraction system in combination with two-dimensional gas chromatographic separation and parallel mass spectrometric and olfactometric characterization of the analytes. The present invention shows that the technique can be used both for direct extractive sampling, but also for headspace analysis. Due to its applicability for small sample volumes, even day-to-day physiological variations in the profiles of volatile organic compounds in human milk samples, but also fluctuations within e.g. one breastfeeding episode can be monitored.

Accordingly, the object of the present invention is to provide nutraceutical compositions that are more attractive for babies and newborns.

SUMMARY OF THE INVENTION

The finding of the present invention is to select specific odorants of human milk to use them in nutraceutical compositions.

The present invention relates to the use of odorants of the human milk for improving the acceptance of nutraceutical compositions for babies and newborns.

The preferred nutraceutical composition is infant formula. By addition of the identified odorants or key odorants the acceptance of the food product by the baby or newborn is enhanced.

Further the acceptance of objects that come into contact with babies or newborns may be improved. Especially the acceptance of breast comfort aid systems can be improved when flavored with the identified odorants or mixtures thereof.

In addition the acceptance of other products such as pacifier, pillows or toys may be improved.

A further aspect relates to the improvement of acceptance of persons. Especially parents or caregivers being scented with the identified odorants might endure less rejection by the babies or newborns.

A further aspect relates to the general comfort of the baby. The use of the identified odorants will help to pacify a baby.

Further the invention relates to the use of sorptive technique for analyzing milk or infant formulas.

DETAILED DESCRIPTION OF THE PREFERRED EMBODIMENTS

In the following the odorants of the invention are classified in the following lists:
LIST 1
Methylpropanal, butan-2,3-dione (diacetyl), hexanal, 1-hexen-3-one, octanal, 1-octen-3one, (Z)-1,5-octadien-3-one, nonanal, non-1-en-3-one, (E)-2-octenal, acetic acid, 3-methylthio propanal (methional), decanal, (Z)-non-2-enal, 3-isobutyl-2-methoxypyrazine, (E)-non-2-enal, linalool, (E,Z)-nona-2,6-dienal, (E,E)-octa-2,4-dienal, butanoic acid, phenylacetaldehyde, 2/3-methylbutanoic acid, (E,E)-nona 2,4-dienal, pentanoic acid, (E,E)deca-2,4-dienal, 2-methoxyphenol (guaiacol), 2-phenylethanol, β-ionone, tr-(4,5)-epoxy(E)-dec-2-enal, 4-hydroxy-2,5-dimethyl-3(2H)-furanone, γ-nonalactone, γ-decalactone, 4-ethyloctanoic acid, δ-decalactone, 3-hydroxy-4,5-dimethyl-2(5H)-furanone (sotolon), 2-aminoacetophenone, (Z)-6-γ-dodecenolactone, δ-dodecalactone, 3-methylindole (skatol), phenylacetic acid, vanillin, 5α-androst-16-en-3α-one, 4,16-androstadien-3-one, 1,4-androstadien-3,17-dion
LIST 2
1-hexen-3-one, (Z)-1,5-octadien-3-one, non-1-en-3-one, (E)-2-octenal, decanal, (Z)-non-2-enal, 3-isobutyl-2-methoxypyrazine, (E)-non-2-enal, linalool, (E,Z)-nona-2,6-dienal, (E,E)-octa-2,4-dienal, phenylacetaldehyde, 2/3-methylbutanoic acid, (E,E)-nona-2,4-dienal, 2-methoxyphenol (guaiacol), 2-phenylethanol, β-ionone, tr-(4,5)-epoxy-(E)-dec-2-enal, γ-nonalactone, γ-decalactone, 4-ethyloctanoic acid, δ-decalactone, 3-hydroxy-4,5-dimethyl-2(5H)-furanone (sotolon), 2-aminoacetophenone, (Z)-6-γ-dodecenolactone, δ-dodecalactone, 3-methylindole (skatol), phenylacetic acid, 5α-androst-16-en-3α-one LIST 3
Methylpropanal, butan-2,3-dione (diacetyl), 1-hexen-3-one, (Z)-1,5-octadien-3-one, non-1-en-3-one, 3-methylthio propanal (methional), 3-isobutyl-2-methoxypyrazine, linalool, (E,E)-octa-2,4-dienal, butanoic acid, phenylacetaldehyde, 2/3-methylbutanoic acid, pentanoic acid, 2-methoxyphenol (guaiacol), 2-phenylethanol, β-ionone, tr-(4,5)-epoxy-(E)-dec-2-enal, γ-nonalactone, 4-ethyloctanoic acid, δ-decalactone, 3-hydroxy-4,5-dimethyl-2(5H)-furanone (sotolon), 2-aminoacetophenone, (Z)-6-γ-dodecenolactone, 3-methylindole (skatol), phenylacetic acid, vanillin, 5α-androst-16-en-3α-one LIST 4
Butan-2,3-dione (diacetyl), 1-hexen-3-one, 1-octen-3-one, (Z)-1,5-octadien-3-one, non-1-en-3-one, phenylacetaldehyde, (E,E)-deca-2,4-dienal, β-ionone, tr-(4,5)-epoxy-(E)-dec-2-enal, γ-nonalactone, γ-decalactone, 4-ethyloctanoic acid, δ-decalactone, 3-hydroxy-4,5-dimethyl-2(5H)-furanone (sotolon), 2-aminoacetophenone, (Z)-6-γ-dodecenolactone, 6-dodecalactone, 3-methylindole (skatol), phenylacetic acid, 5α-androst-16-en-3α-one, δ4,16-androstadien-3-one, 1,4-androstadien-3,17-dion LIST 5
Hexanoic acid, heptanoic acid, octanoic acid, nonanoic acid, decanoic acid, dodecanoic acid, 3-methyl-2-hexenoic acid, δ-octalactone, γ-octalactone, δ-nonalactone, γ-dodecalactone, δ4,16-androstadien-3-one, 1,4-androstadien-3,17-dione, (Z)-4-heptenal, ethyl isobutanoate, ethyl butanoate, ethyl 2-methyl butanoate, ethyl 3-methylbutanoate, ethyl hexanoate, ethyl octanoate The present invention relates in one embodiment (1) to a nutraceutical composition for newborns or babies comprising at one of the odorants of LIST 1 or mixtures thereof. The composition may also comprise at least two, or at least three, or at least four or at least five, or at least six, or at least seven or at least eight, or at least nine, or at least ten or at least 11, or at least 12, or at least 13, or at least 14, or least 15, or at least 16 or at least 17, or least 18, or least 19, or least 20 odorants of LIST 1.

Preferably in another embodiment (2) the composition, i.e. the nutraceutical composition according to this invention, comprises at least one of the odorants of LIST 2 or LIST 3 or mixtures thereof. The compositions might comprise at least one additional odorant selected from LIST 1. The composition may also comprise at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1.

Preferably in a further embodiment (3) the composition, i.e. the nutraceutical composition according to this invention, comprises at least one compound of LIST 4.

The composition may also comprise at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1.

In an especially preferred embodiment (4), said nutraceutical composition comprises at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 odorants of LIST 4. More preferred the composition comprises at least 4 compounds of LIST 4. Especially preferred, the nutraceutical composition comprises only odorants of human milk as listed in List 4.

Additionally, in one of the above-mentioned embodiments (1) to (4), compounds of LIST 5 may be added.

A preferred composition comprises at least one of the following compounds: 5α-androst-16-en-3α-one, δ4,16-androstadien-3-one, 1,4-androstadien-3,17-dion. The composition may comprise at least one additional odorant selected from LIST 1 or preferably LIST 4.

Especially, a preferred nutraceutical composition relates to infant formula or infant food. Infant formula may be in powder or liquid form.

Further, the invention relates to a process for the manufacture of nutraceutical compositions characterized by the addition of an odorants as described for the nutraceutical composition. Especially, the invention relates to manufacture of infant formula or infant food.

The odorant might be added as pure compounds or as mixtures with other nutrients. For example in LIST 1 defined degradation products of fatty acids might be added in combination with fatty acids.

The same applies for proteins, vitamins, or carbohydrates such as oligosaccharides or lactose. In such a case the presence and the amount of every above mentioned odorant might be determined during the production of the nutraceutical composition.

Thus, the invention also relates to the determination of the presence and quantification of at least one odorant of LIST 1 or preferably LIST 2 or LIST 3 or LIST 4 in nutraceutical compositions for babies.

If at least one of the above mentioned odorants was detected and quantified, the concentration of the at least one odorants might be adjusted to a concentration as indicated in table 2. The concentrations relate to the composition ready to be administered to the baby. Consequently, the concentrations of a concentrate have to be adjusted accordingly. Typically the concentration of the odorant in a powder-concentrate is 5-15 times, preferably about 10 times above the final concentration.

Thus, the invention also relates to the determination and quantification of at least one odorant of LIST 1 or preferably LIST 2 or LIST 3 or LIST 4 in nutraceutical compositions for babies, whereby the concentration of the odorants is adapted to give a nutraceutical composition ready to be administered to babies that has the concentration of the odorant as listed in table 2.

Further, the ratio between the at least one identified odorant and a further odorant might be adjusted according to ratios derivable from the concentrations indicated in table 2.

Thus, the invention relates to a method for improving the baby's or newborn's acceptance of a nutraceutical composition, especially infant formula, by using at least compound selected from LIST 1, formula. The method also comprises the use of at least two, or at least three, or at least four or at least five, or at least six, or at least seven or at least eight, or at least nine, or at least ten or at least 11, or at least 12, or at least 13, or at least 14, or least 15, or at least 16 or at least 17, or least 18, or least 19, or least 20 odorants of LIST 1.

Preferably the method comprises the use of at least one of the odorants of LIST 2 or LIST 3 or mixtures thereof. The method also comprises the use of at least one additional odorant selected from LIST 1. The method also comprises the use of at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1.

Preferably the method comprises the use of at least one compound of LIST 4. Also at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1 may be used.

Preferably at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 odorants of LIST 4 are used. More preferred at least 4 compounds of LIST 4 are used.

Additionally, compounds of LIST 5 may be added.

A preferred method comprises the use of at least one of the following compounds: 5α-androst-16-en-3α-one, δ4,16-androstadien-3-one, 1,4-androstadien-3,17-dion, optionally in addition of at least one odorant selected from LIST 1 or preferably LIST 4.

Further the invention relates to a method of improving the acceptance of objects that come into contact with the baby or newborn by scenting these with an odorant selected from LIST 1 or mixtures thereof. The method also comprises the use of at least two, or at least three, or at least four or at least five, or at least six, or at least seven or at least eight, or at least nine, or at least ten or at least 11, or at least 12, or at least 13, or at least 14, or least 15, or at least 16 or at least 17, or least 18, or least 19, or least 20 odorants of LIST 1.

Preferably the method comprises the use of at least one of the odorants of LIST 2 or LIST 3 or mixtures thereof. The method also comprises the use of at least one additional odorant selected from LIST 1. The method also comprises the use of at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1.

Preferably the method comprises the use of at least one compound of LIST 4. Also at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1 may be used.

Preferably at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 odorants of LIST 4 are used. More preferred at least 4 compounds of LIST 4 are used.

Additionally, compounds of LIST 5 may be added.

A preferred method comprises the use of at least one of the following compounds: 5α-androst-16-en-3α-one, δ4,16-androstadien-3-one, 1,4-androstadien-3,17-dion, optionally in addition of at least one odorant selected from LIST 1 or preferably LIST 4.

Such objects include breast comfort aide systems, pacifiers, sucking devices in general, toys, pillows, clothing, incubators and medical equipment.

The scenting might be added during the production process or after manufacture. The object may be impregnated or a composition may be applied which comprises at least one of the above mentioned odorants. Such a composition may be selected from cream, ointment, lotion, emulsion, oil, suspension, varnish, or solution.

Thus invention relates to a cream, ointment, lotion, emulsion, oil, suspension, varnish, or solution, comprising the odorants as described above.

Further the invention relates to a method of improving the acceptance of a person by babies or newborn or to a method of pacifying a baby by using a composition with an odorant selected from LIST 1 or mixtures thereof. The method also comprises the use of at least two, or at least three, or at least four or at least five, or at least six, or at least seven or at least eight, or at least nine, or at least ten or at least 11, or at least 12, or at least 13, or at least 14, or least 15, or at least 16 or at least 17, or least 18, or least 19, or least 20 odorants of LIST 1.

Preferably the method comprises the use of at least one of the odorants of LIST 2 or LIST 3 or mixtures thereof. The method also comprises the use of at least one additional odorant selected from LIST 1. The method also comprises the use of at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1.

Preferably the method comprises the use of at least one compound of LIST 4. Also at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 additional odorants of LIST 1 may be used.

Preferably at least two, or at least three, or at least four or at least five, or at least six, or at least seven or at least eight, or at least nine, or at least ten or at least 11, or at least 12, or at least 13, or at least 14, or least 15, or at least 16 or at least 17, or at least 18, or at least 19, or at least 20 odorants of LIST 4 are used. More preferred at least 4 compounds of LIST 4 are used.

Additionally, compounds of LIST 5 may be added.

A preferred method comprises the use of at least one of the following compounds: 5α-androst-16-en-3α-one, δ4,16-androstadien-3-one, 1,4-androstadien-3,17-dion, optionally in addition of at least one odorant selected from LIST 1 or preferably LIST 4.

The composition might be applied topically to the skin or clothing of the person. An area where the composition is to be applied may be the breast, especially woman's breast. The composition may be applied in form of a balm, perfume, cream, ointment, lotion, body milk, emulsion, oil, suspension, nail varnish or solution.

Thus invention relates to a balm, perfume, cream, ointment, lotion, body milk, emulsion, oil, suspension, nail varnish or solution comprising the odorants as described above.

Persons that may benefit from the use of above described odorants include parents, caregivers and medical staff.

Moreover the invention relates to a method of analyzing milk or infant formulas characterized by the use of sorptive extraction. The sorptive extraction may be combined with gas chromatographic separation. Preferably the sorptive device is introduced into the liquid. Preferably the absorbent/adsorbent material is polydimethylsiloxane (PDMS). The preferred adsorbent device is a stir bar, a sheet, or beads or powder. The beads or the powder may be encapsulated in a capsule with pores or any other kind of openings. Preferably the device is a stir bar. Preferably the method is used for the analysis of odorants.

Whole human breast milk may be excluded from all compositions described herein. Also compositions comprising whole human breast milk and additional components may be excluded. By the same token whole animal milk, especially cow, ewe, goat, horse, donkey, lama or camel milk may be excluded. Also compositions which contain whole animal milk where additives have been added may be excluded. The term animal milk should include raw, heated or UHT milk.

All odorants may also be used as precursors.

TABLE 1

Characterization of odor-active compounds in human milk by means of SBSE-gas chromatography-olfactometry/mass spectrometry.

| No. | Odorant[a] | CAS-number | Odor quality[b] | Sampling technique[c] | Retention index[d] on DB-FFAP | DB-5 |
|---|---|---|---|---|---|---|
| 1) | methylpropanal | 78-84-2 | malty | HS, SA | 0821 | 0552 |
| 2) | butan-2,3-dione (diacetyl) | 431-03-8 | buttery | HS, SA | 0981 | 0596 |
| 3) | hexanal | 66-25-1 | grassy | HS, SA | 1079 | 0801 |
| 4) | unknown | — | geranium leaf-like | HS, SA | 1081 | Nd |
| 5) | 1-hexen-3-one | 1629-60-3 | glue-like, metallic | HS, SA | 1086 | 0775 |
| 6) | octanal | 124-13-0 | citrussy, soapy | HS, SA | 1280 | 1004 |
| 7) | 1-octen-3-one | 4312-99-6 | mushroom-like | HS, SA | 1295 | 0980 |
| 8) | (Z)-1,5-octadien-3-one | 65767-22-8 | geranium leaf-like | HS, SA | 1372 | 0984 |
| 9) | nonanal | 124-19-6 | citrussy, soapy | SA | 1385 | 1103 |
| 10) | non-1-en-3-one | 24415-26-7 | mushroom-like | SA | 1395 | 1077 |
| 11) | (E)-2-octenal | 2548-87-0 | fatty, perfume-like | HS, SA | 1423 | 1059 |
| 12) | acetic acid | 64-19-7 | acidic | HS, SA | 1451 | Nd |
| 13) | 3-methylthio propanal (methional) | 3268-49-3 | cooked potato | HS, SA | 1452 | 0905 |
| 14) | decanal | 112-31-2 | citrussy, soapy | SA | 1497 | 1207 |
| 15) | (Z)-non-2-enal | 31823-43-5 | fatty, tallowy | HS, SA | 1502 | 1148 |
| 16) | 3-isobutyl-2-methoxypyrazine | 24683-00-9 | bellpepper-like | SA | 1517 | 1184 |
| 17) | (E)-non-2-enal | 18829-56-6 | fatty, cucumber-like | HS, SA | 1527 | 1161 |
| 18) | linalool | 78-70-6 | citrussy, flowery | SA | 1540 | 1103 |
| 19) | (E,Z)-nona-2,6-dienal | 557-48-2 | cucumber-like | SA | 1583 | 1154 |
| 20) | (E,E)-octa-2,4-dienal | 30361-28-5 | fatty | SA | 1585 | 1110 |
| 21) | butanoic acid | 107-92-6 | sweaty | HS, SA | 1619 | 0821 |
| 22) | phenylacetaldehyde | 122-78-1 | honey-like | SA | 1642 | 1047 |
| 23) | 2/3-methylbutanoic acid | 600-07-7 503-74-2 | sweaty | SA | 1661 | 0875 |
| 24) | (E,E)-nona-2,4-dienal | 5910-87-2 | fatty | HS, SA | 1698 | 1215 |
| 25) | pentanoic acid | 109-52-4 | sweaty | SA | 1720 | 0911 |
| 26) | (E,E)-deca-2,4-dienal | 25152-84-5 | fatty | SA | 1804 | 1318 |
| 27) | 2-methoxyphenol (guaiacol) | 90-05-1 | phenolic | SA | 1859 | Nd |
| 28) | 2-phenylethanol | 60-12-8 | honey-like | SA | 1902 | 1117 |
| 29) | β-ionone | 79-77-6 | violet-like | SA | 1933 | 1491 |
| 30) | tr-(4,5)-epoxy-(E)-dec-2-enal | 134454-31-2 | metallic | HS, SA | 2006 | 1382 |
| 31) | 4-hydroxy-2,5-dimethyl-3(2H)-furanone | 3658-77-3 | caramel-like | HS, SA | 2031 | 1070 |
| 32) | γ-nonalactone | 104-61-0 | coconut-like, flowery | HS, SA | 2035 | 1363 |
| 33) | unknown | — | metallic | SA | 2106 | Nd |
| 34) | γ-decalactone | 706-14-9 | sweet, coconut-like | HS, SA | 2137 | 1470 |
| 35) | 4-ethyloctanoic acid | 16493-80-4 | goat-like | SA | 2190 | Nd |
| 36) | δ-decalactone | 705-86-2 | coconut-like | HS, SA | 2190 | 1497 |
| 37) | 3-hydroxy-4,5-dimethyl-2(5H)-furanone (sotolon) | 87021-36-1 | savory-like | SA | 2196 | 1110 |
| 38) | unknown | — | goat-like | SA | 2200 | Nd |
| 39) | 2-aminoacetophenone | 551-93-9 | sweet | SA | 2200 | 1300 |

TABLE 1-continued

Characterization of odor-active compounds in human milk by means of SBSE-gas chromatography-olfactometry/mass spectrometry.

| No. | Odorant[a] | CAS-number | Odor quality[b] | Sampling technique[c] | Retention index[d] on DB-FFAP | DB-5 |
|---|---|---|---|---|---|---|
| 40) | (Z)-6-γ-dodecenolactone | 18679-18-0 | peach-like, green | SA | 2380 | 1670 |
| 41) | δ-dodecalactone | 713-95-1 | sweet | SA | 2426 | 1715 |
| 42) | unknown | — | musty | SA | 2460 | 1563 |
| 43) | 3-methylindole (skatol) | 83-34-1 | faeces-like | SA | 2484 | 1388 |
| 44) | phenylacetic acid | 103-82-2 | honey-like | HS, SA | 2551 | 1262 |
| 45) | vanillin | 121-33-5 | vanilla-like | HS, SA | 2569 | 1404 |
| 46) | 5α-androst-16-en-3α-one | 18339-16-7 | urine-like, animalic | SA | >2600 | Nd |

[a]The compounds were identified by comparing it with the reference odorant based on the following criteria: retention indices on the capillaries named in the table, mass spectra obtained by MS/EI and MS/CI, odor quality and intensity perceived at the sniffing port.
[b]Odor quality perceived at the sniffing port.
[c]Sampling technique: HS: HRGC-Olfactometric detection of odorants via PDMS bar - headspace sampling, SA: HRGC-Olfactometric detection of odorants via direct stir bar sorptive extraction of the milk sample.
[d]Retention indices were calculated according to Halang WA, Langlais R, Kugler E. Anal. Chem. 1978, 50: 1809-1832.

TABLE 2

Concentration ranges of odorants in the nutraceutical infant formulation.

| No. | Odorant[a] | Range | Preferred range [μg/kg] | Most preferred range |
|---|---|---|---|---|
| 1) | methylpropanal | 1-10 000 | 1-1 000 | 1-200 |
| 2) | butan-2,3-dione (diacetyl) | 0.01-1 000 | 0.1-500 | 0.5-50 |
| 3) | hexanal | 0.1-1 000 | 0.5-500 | 1-100 |
| 4) | unknown | — | — | — |
| 5) | 1-hexen-3-one | 0.01-1 000 | 0.1-100 | 0.5-20 |
| 6) | octanal | 0.05-1 000 | 0.1-500 | 1-100 |
| 7) | 1-octen-3-one | 0.001-1 000 | 0.01-100 | 0.1-100 |
| 8) | (Z)-1,5-octadien-3-one | 0.01-1 000 | 0.1-100 | 0.1-20 |
| 9) | nonanal | 0.05-1 000 | 0.1-500 | 1-100 |
| 10) | non-1-en-3-one | 0.001-1 000 | 0.01-100 | 0.1-100 |
| 11) | (E)-2-octenal | 0.1-100 | 0.1-10 | 0.1-5 |
| 12) | acetic acid | 10-100 000 | 100-50 000 | 1000-20 000 |
| 13) | 3-methylthio propanal (methional) | 0.05-100 | 0.1-50 | 0.5-10 |
| 14) | decanal | 0.05-1 000 | 0.1-500 | 1-200 |
| 15) | (Z)-non-2-enal | 0.01-50 | 0.1-1 | 0.1-0.5 |
| 16) | 3-isobutyl-2-methoxypyrazine | 0.01-100 | 0.05-50 | 0.1-10 |
| 17) | (E)-non-2-enal | 0.1-100 | 0.1-10 | 0.1-5 |
| 18) | linalool | 0.001-1 000 | 0.01-100 | 0.1-100 |
| 19) | (E,Z)-nona-2,6-dienal | 0.05-50 | 0.05-10 | 0.05-1.0 |
| 20) | (E,E)-octa-2,4-dienal | 0.001-1 000 | 0.01-100 | 0.1-100 |
| 21) | butanoic acid | 10-100 000 | 100-50 000 | 1 000-20 000 |
| 22) | phenylacetaldehyde | 0.001-1 000 | 0.01-100 | 0.1-100 |
| 23) | 2/3-methylbutanoic acid | 0.1-10 000 | 1-1 000 | 10-500 |
| 24) | (E,E)-nona-2,4-dienal | 0.001-1 000 | 0.01-100 | 0.1-100 |
| 25) | pentanoic acid | 10-100 000 | 100-50 000 | 1 000-20 000 |
| 26) | (E,E)-deca-2,4-dienal | 0.001-1 000 | 0.01-100 | 0.1-100 |
| 27) | 2-methoxyphenol (guaiacol) | 0.001-1 000 | 0.01-100 | 0.1-100 |
| 28) | 2-phenylethanol | 0.5-10 000 | 1-1 000 | 1-300 |
| 29) | β-ionone | 0.001-1 000 | 0.01-100 | 0.1-10 |
| 30) | tr-(4,5)-epoxy-(E)-dec-2-enal | 0.001-1 000 | 0.01-100 | 0.1-100 |
| 31) | 4-hydroxy-2,5-dimethyl-3(2H)-furanone | 0.01-10 000 | 0.1-1 000 | 0.5-50 |
| 32) | γ-nonalactone | 1-1 000 | 10-500 | 10-100 |
| 33) | unknown | — | — | — |
| 34) | γ-decalactone | 1-10 000 | 1-500 | 1-100 |
| 35) | 4-ethyloctanoic acid | 0.01-10 000 | 0.1-1 000 | 0.5-50 |
| 36) | δ-decalactone | 10-10 000 | 10-1 000 | 10-200 |
| 37) | 3-hydroxy-4,5-dimethyl-2(5H)-furanone (Sotolon) | 0.01-10 000 | 0.1-1 000 | 0.5-50 |

TABLE 2-continued

Concentration ranges of odorants in the nutraceutical infant formulation.

| No. | Odorant[a] | Range | Preferred range [µg/kg] | Most preferred range |
|---|---|---|---|---|
| 38) | unknown | — | — | — |
| 39) | 2-aminoacetophenone | 0.01-1 000 | 0.1-100 | 0.5-50 |
| 40) | (Z)-6-γ-dodecenolactone | 0.1-10 000 | 1-1 000 | 10-200 |
| 41) | δ-dodecalactone | 0.1-10 000 | 1-1 000 | 10-200 |
| 42) | unknown | — | — | — |
| 43) | 3-methylindole (skatol) | 0.01-1 000 | 0.1-100 | 0.1-50 |
| 44) | phenylacetic acid | 10-100 000 | 100-50 000 | 1 000-20 000 |
| 45) | vanillin | 0.1-500 | 0.5-100 | 0.5-10 |
| 46) | 5α-androst-16-en-3α-one | 0.001-10 000 | 0.01-1 000 | 0.1-100 |

TABLE 3

Additional odor-active substances as constituents of the formulation.

| No. | Odorant[a] | Range | Preferred range [µg/kg] | Most preferred range |
|---|---|---|---|---|
| 1) | hexanoic acid | 10-50 000 | 100-10 000 | 500-8 000 |
| 2) | heptanoic acid | 10-50 000 | 100-10 000 | 500-8 000 |
| 3) | octanoic acid | 10-50 000 | 100-10 000 | 500-8 000 |
| 4) | nonanoic acid | 10-50 000 | 100-10 000 | 500-8 000 |
| 5) | decanoic acid | 10-50 000 | 100-10 000 | 500-10 000 |
| 6) | dodecanoic acid | 10-50 000 | 100-10 000 | 500-8 000 |
| 7) | 3-methyl-2-hexenoic acid | 0.01-50 000 | 0.1-10 000 | 1-1 000 |
| 8) | δ-octalactone | 1-1 000 | 10-500 | 10-100 |
| 9) | γ-octalactone | 1-1 000 | 10-500 | 10-100 |
| 10) | δ-nonalactone | 1-1 000 | 10-500 | 10-100 |
| 11) | γ-dodecalactone | 0.1-10 000 | 1-1 000 | 10-200 |
| 12) | δ4,16-androstadien-3-one | 0.001-10 000 | 0.01-1 000 | 0.1-100 |
| 13) | 1,4-androstadien-3,17-dione | 0.001-10 000 | 0.01-1 000 | 0.1-100 |
| 14) | (Z)-4-heptenal | 0.001-10 | 0.01-1 | 0.02-0.1 |
| 15) | ethyl isobutanoate | 0.001-100 | 0.01-50 | 0.1-10 |
| 16) | ethyl butanoate | 0.01-500 | 0.1-100 | 1-50 |
| 17) | ethyl 2-methyl butanoate | 0.001-100 | 0.01-50 | 0.1-10 |
| 18) | ethyl 3-methylbutanoate | 0.001-100 | 0.01-50 | 0.1-10 |
| 19) | ethyl hexanoate | 0.01-500 | 0.1-100 | 1-50 |
| 20) | ethyl octanoate | 0.01-500 | 0.1-100 | 1-50 |

DEFINITIONS

Nutraceutical compositions for babies and newborn include any type of nutraceutical composition adapted for babies or newborn. Preferred are infant formula and infant food, especially infant formula. The infant formula may be in powder or liquid or semi-liquid form. The infant formula may be based on recommendations by the American Academy of Pediatrics Committee on Nutrition. The following should be included at least:

Protein, fat, linoleic acid, vitamins: A, C, D, E, K, thiamin (B1), riboflavin (B2), B6, B12, niacin, folic acid, pantothenic acid, calcium, metals: magnesium, iron, zinc, manganese, copper, phosphorus, iodine, sodium chloride, potassium chloride.

In addition, biotin, choline, inositol should be included. Normally they are based on cow milk or soy milk. Infant formula may also be based on milk from other animals such as camel, ewe or goat.

The infant formula will be adapted for premature babies, for newborn babies up to one month, for babies up to three months, for babies up to four months, for babies up to five months, for babies up to six months, or babies up to 1 year. The infant formula may be designed for babies from birth to four months. The infant formula nay be adapted for baby from the forth month or from the eighth month. Preferably the infant formula is designed for premature babies, for babies up to one month, for babies up to four months, or for babies up to six months.

The term nutraceutical composition comprises also concentrates which have to be diluted before administration to the baby.

The term newborn or baby relates to any baby including premature babies, babies up to four months, up to six months or babies up to one year. Preferably the term relates to premature babies or babies up to six months.

EXPERIMENTAL

Chemicals

The following reference compounds were obtained from the suppliers shown: 2'-aminoacetophenone≥98%, 5α-androst-16-en-3α-one≥98%, butane-2,3-dione≥99%, butanoic acid≥99.5%, (E,E)-deca-2,4-dienal 85%, (+/−)-δ-decalactone≥98%, (+/−)-γ-decalactone≥98%, decanal≥99%, (+/−)-δ-dodecalactone≥98%, (Z)-6-γ-dodecenolactone≥85%, 4-hydroxy-2,5-dimethyl-3(2H)-furanone≥99%; 3-hydroxy-4,5-dimethyl-2(5H)-furanone (sotolon)≥98%, hexanal 98%, 3-isobutyl-2-methoxypyrazine≥99%, (+/−)-linalool≥97%, 3-methylindole (skatol)≥99%, methylpropanal≥99%, 3-(methylthio)-propanal 85%, (+/−)-2- and 3-methylbutanoic acid 99%, (E,E)-2,4-nonadienal≥85%, (E/Z)-2,6-nonadienal 95%, (+/−)-γ-nonalactone≥98%, nonanal≥95%, (E)-2-nonenal 97%, (E,E)-octa-2,4-dienal≥96%, octanal 99%, (E)-oct-2-enal≥94%, pentanoic acid≥99%, phenylacetaldehyde≥90%, phenylacetic acid≥99%, 2-phenylethanol≥99% (Sigma-Aldrich, Steinheim, Germany), acetic acid≥99%, 2-methoxyphenol≥99.5%, vanillin≥99% (Merck, Darmstadt, Germany), (E)-β-damascenone 98% (Haarmann and Reimer, Holzminden, Germany), β-ionone≥99% (Roth, Karlsruhe, Germany), 1-octen-3-one 95% (Lancaster, Mühlheim, Germany). The following compounds were synthesized according to the literature tr-4,5-epoxy-(E)-2-decenal (Schieberle P, Grosch W. Z. Lebensm. Unters. Forsch. 1991, 192: 130-135), 1-hexen-3-one (Blank I, Fischer K H, Grosch W. Z. Lebensm. Unters. Forsch. 1989, 189: 426-433), (Z)-octa-1,5-dien-3-one (Ulrich F, Grosch W. J. Am. Oil Chem. Soc. 1988, 65: 1313-1317), (Z)-non-2-enal (Ullrich F, Grosch W. Fat Sci. Technol. 1988, 90:332-336), 4-ethyloctanoic acid (Rota V. Charakterisierung von Schlüsselaromastoffen in rohem and gekochtem Schaffleisch durch Anwendung von Struktur/

Wirkungskonzepten. PhD thesis, Technical University Munich, Germany, Verlag Dr. Hut, Muenchen, Germany, 2004). The compounds were freshly distilled prior to analysis. Chemical and sensory purity was checked by gas chromatography-olfactometry (GC/O) as well as gas chromatography-mass spectrometry (GC-MS).

Samples

Ten samples of human milk were collected from different donors and immediately stored for a maximum of two days prior to analysis at −18° C. Panelists were non-pregnant volunteers (non-smokers, Germans of Caucasian ethnicity) in the age range 28-35 (mean age 32), exhibiting no known illnesses at the time of examination. Breast milk production was normal and no breast infection was detected prior to milk sampling. Sampling took place in the lactation period from 12 to 20 weeks postpartum. 20 mL samples were taken during the day, about 1-2 hours after a light meal that was relatively weak in odor (water, plain bread with little amounts of butter and cottage cheese), right before a regular breast feeding episode. Prior to sample collection and analysis, written consent has been obtained from all participants providing human milk samples after full explanation of the purpose and nature of the study.

PDMS-coated Stir Bars

For the experiments, commercially available Twister®-SBSE bars (20 mm length, 0.5 mm POMS coating thickness and ~50 μL of total POMS volume according to the suppliers specifications; Gerstel GmbH, Mühlheim a/d Ruhr, Germany) were used. Prior to analysis, the bars were subjected to a conditioning procedure according to the suppliers recommendations: the stir bars were first soaked in 100% acetonitrile for at least two days, then conditioned at 300° C. for 4 h.

Each SBSE bar was first screened for odorants ("background", see "Results and Discussion") and then directly used for analysis. Each stir bar was used for just one single experiment, then reconditioned and screened for background again. Each experiment was performed with at least three different SBSE bars to avoid SBSE bar variations.

Direct StirBar Sorptive Extraction of Human Milk Samples

Five mL of each human milk sample were pipetted separately into 10 mL closed glass vessels and tightly sealed with a lid. Glass vessels had been thoroughly cleaned prior to analysis and heat-conditioned at 110° C. to avoid any odorous contamination. A SBSE bar was immediately placed in the respective sample, stirred for 1 h, removed with tweezers, dipped into deodorized water, briefly dried with lint-free tissue and immediately placed into the thermo-desorption unit.

Headspace Sampling

Five mL of each human milk sample were pipetted separately into 10 mL closed glass vessels, affixed with inserts for headspace exposition of the PDMS stir bar, and tightly sealed with a lid. Glass vessels had been thoroughly cleaned prior to analysis and heat-conditioned at 110° C. to avoid any odorous contamination. Equilibration of the SBSE bar within the headspace insert above the stirred sample was conducted for 1 h. Then, the SBSE bar was removed with tweezers, dipped into deodorized water, briefly dried with lint-free tissue and immediately placed into the thermo-desorption unit.

SBSE Thermo-Desorptive Sample Application

Thermo-desorption of the samples was performed by means of a TDS-2 thermo-desorption system (Gerstel GmbH) in combination with a CIS-4 PTV injector (Gerstel GmbH) for cryofocussing the analytes prior to transfer onto the analytical column. The following sampling parameters were used: Splitless thermal desorption was performed by programming the TDS-2 from 40° C. to 240° C. (5 min) at a rate of 60° C. Cryofocussing was performed with liquid nitrogen at −100° C. Injection was performed with a ramp of 12° C./s from −100° C. to 240° C. (5 min). The gas chromatographic conditions are given below.

High Resolution Gas Chromatography-Olfactometry

Application of the samples was performed as described above (SBSE Thermo-Desorptive Sample Application). The odorants were screened in parallel by three panelists by sniffing the effluent after gas chromatographic separation. Sniffing analysis was repeated three times by each panelist. All detected odorants were identified by comparison with reference substances on the basis of the following criteria: retention index (RI) on two stationary phases of different polarity (DB-FFAP, DB-5), mass spectra obtained by MS (EI) and MS (CI); and odor quality as well as odor intensity perceived at the sniffing-port. Only if the odor quality and intensity of the reference agrees with that detected via GC-O, identification can be regarded as "positive".

The one- (for sniffing) or two-dimensional (for mass spectrometric identification) gas chromatographic system (TD-HRGC) consisted of a Mega 2 gas chromatograph (Fisons Instruments, Mainz-Kastel, Germany) as the precolumn system in tandem with a Fisons GC 5160 as the main column system. The following fused silica columns were used: DB-FFAP (30 m×0.32 mm i.d., 0.25 μm FD, J & W Scientific, Folsom, USA) and/or DB-5 (SE-54; 30 m×0.32 mm i.d., 0.25 μm FD, J & W Scientific, Folsom, USA). The gas chromatographic conditions were the same as described previously.

High Resolution Gas Chromatography-Mass Spectrometry

The odorants were analyzed by two-dimensional gas chromatography (TD-HRGC) as described above. MS analyses were performed in parallels with the sniffing analysis on the main column system with an ITD-8OO (Fisons Instruments, Mainz-Kastel, Germany) running in the CI-mode with methanol as the reagent gas. The following fused silica columns were used: DB-FFAP (30 m×0.32 mm i.d., 0.25 μm FD, J & W Scientific, Folsom, USA) in combination with DB-5 (SE-54; 30 m×0.32 mm i.d., 0.25 μm FD, J & W Scientific, Folsom, USA). The gas chromatographic and mass spectrometric conditions were the same as described previously.

Characterization Odor-Active Compounds Via PDMS Bar—Headspace Sampling

When analyzing the headspace above the human milk samples by means of HRGC-olfactometry of the adsorbed substances, a total of 22 odor-active compounds was detected.

Twenty-one of these were identified based on the criteria given in the experimental section (cf. Table 2). Among the detected compounds were a series of fatty smelling compounds, (E)-oct-2-enal, (Z)-non-2-enal, (E)-non-2-enal, (E,E)-nona-2,4-dienal, grassy, leaf-like and citrussy substances (hexanal, octanal), and several coconut-like smelling compounds of the lactone group, that is γ-nonalactone, γ-decalactone, and δ-decalactone. Acidic and sweaty impressions were due to acetic acid and butanoic acid. Apart from that, several sweet substances were detectable, such as the honey-like smelling phenylacetic acid, as well as 4-hydroxy-2,5-dimethyl-3(2H)-furanone (caramel-like) and vanillin (vanilla-like). Metallic, mushroom- and geranium leaf-like substances were hex-1-en-3-one, oct-1-en-3-one, (Z)-octa-1,5-dien-3-one and tr-(4,5)-epoxy-(E)-2-decenal and an unidentified geranium leaf-like smelling odorant.

Specific malty, buttery and cooked potato-like impressions were elicited by methylpropanal, diacetyl, and methional, respectively. With the exception of the unknown geranium leaf-like compound, all odorants were detectable in all milk samples from different donors (Table 1).

TABLE 1

Characterization of odor-active compounds in human milk by means of SBSE-gas chromatography-olfactometry/mass spectrometry.

| No. | Odorant[a] | CAS-Number | Odor Quality[b] | Sampling technique[c] | Retention index[d] on DB-FFAP | DB-5 |
|---|---|---|---|---|---|---|
| 1) | methylpropanal | 78-84-2 | malty | HS, SA | 0821 | 0552 |
| 2) | butan-2,3-dione (diacetyl) | 431-03-8 | buttery | HS, SA | 0981 | 0596 |
| 3) | hexanal | 66-25-1 | grassy | HS, SA | 1079 | 0801 |
| 4) | unknown | — | geranium leaf-like | HS, SA | 1081 | Nd |
| 5) | 1-hexen-3-one | 1629-60-3 | glue-like, metallic | HS, SA | 1086 | 0775 |
| 6) | octanal | 124-13-0 | citrussy, soapy | HS, SA | 1280 | 1004 |
| 7) | 1-octen-3-one | 4312-99-6 | mushroom-like | HS, SA | 1295 | 0980 |
| 8) | (Z)-1,5-octadien-3-one | 65767-22-8 | geranium leaf-like | HS, SA | 1372 | 0984 |
| 9) | nonanal | 124-19-6 | citrussy, soapy | SA | 1385 | 1103 |
| 10) | non-1-en-3-one | 24415-26-7 | mushroom-like | SA | 1395 | 1077 |
| 11) | (E)-2-octenal | 2548-87-0 | fatty, perfume-like | HS, SA | 1423 | 1059 |
| 12) | acetic acid | 64-19-7 | acidic | HS, SA | 1451 | Nd |
| 13) | 3-methylthio propanal (methional) | 3268-49-3 | cooked potato | HS, SA | 1452 | 0905 |
| 14) | decanal | 112-31-2 | citrussy, soapy | SA | 1497 | 1207 |
| 15) | (Z)-non-2-enal | 31823-43-5 | fatty, tallowy | HS, SA | 1502 | 1148 |
| 16) | 3-isobutyl-2-methoxypyrazine | 24683-00-9 | bellpepper-like | SA | 1517 | 1184 |
| 17) | (E)-non-2-enal | 18829-56-6 | fatty, cucumber-like | HS, SA | 1527 | 1161 |
| 18) | linalool | 78-70-6 | citrussy, flowery | SA | 1540 | 1103 |
| 19) | (E,Z)-nona-2,6-dienal | 557-48-2 | cucumber-like | SA | 1583 | 1154 |
| 20) | (E,E)-octa-2,4-dienal | 30361-28-5 | fatty | SA | 1585 | 1110 |
| 21) | butanoic acid | 107-92-6 | sweaty | HS, SA | 1619 | 0821 |
| 22) | phenylacetaldehyde | 122-78-1 | honey-like | SA | 1642 | 1047 |
| 23) | 2/3-methylbutanoic acid | 600-07-7 503-74-2 | sweaty | SA | 1661 | 0875 |
| 24) | (E,E)-nona-2,4-dienal | 5910-87-2 | fatty | HS, SA | 1698 | 1215 |
| 25) | pentanoic acid | 109-52-4 | sweaty | SA | 1720 | 0911 |
| 26) | (E,E)-deca-2,4-dienal | 25152-84-5 | fatty | SA | 1804 | 1318 |
| 27) | 2-methoxyphenol (guaiacol) | 90-05-1 | phenolic | SA | 1859 | Nd |
| 28) | 2-phenylethanol | 60-12-8 | honey-like | SA | 1902 | 1117 |
| 29) | β-ionone | 79-77-6 | violet-like | SA | 1933 | 1491 |
| 30) | tr-(4,5)-epoxy-(E)-dec-2-enal | 134454-31-2 | metallic | HS, SA | 2006 | 1382 |
| 31) | 4-hydroxy-2,5-dimethyl-3(2H)-furanone | 3658-77-3 | caramel-like | HS, SA | 2031 | 1070 |
| 32) | γ-nonalactone | 104-61-0 | coconut-like, flowery | HS, SA | 2035 | 1363 |
| 33) | unknown | — | metallic | SA | 2106 | Nd |
| 34) | γ-decalactone | 706-14-9 | sweet, coconut-like | HS, SA | 2137 | 1470 |
| 35) | 4-ethyloctanoic acid | 16493-80-4 | goat-like | SA | 2190 | Nd |
| 36) | δ-decalactone | 705-86-2 | coconut-like | HS, SA | 2190 | 1497 |
| 37) | 3-hydroxy-4,5-dimethyl-2(5H)-furanone (Sotolon) | 87021-36-1 | savory-like | SA | 2196 | 1110 |
| 38) | unknown | — | goat-like | SA | 2200 | Nd |
| 39) | 2-aminoacetophenone | 551-93-9 | sweet | SA | 2200 | 1300 |
| 40) | (Z)-6-γ-dodecenolactone | 18679-18-0 | peach-like, green | SA | 2380 | 1670 |
| 41) | δ-dodecalactone | 713-95-1 | sweet | SA | 2426 | 1715 |

TABLE 1-continued

Characterization of odor-active compounds in human milk by means of SBSE-gas chromatography-olfactometry/mass spectrometry.

| No. | Odorant[a] | CAS-Number | Odor Quality[b] | Sampling technique[c] | Retention index[d] on DB-FFAP | DB-5 |
|---|---|---|---|---|---|---|
| 42) | unknown | — | musty | SA | 2460 | 1563 |
| 43) | 3-methylindole (skatol) | 83-34-1 | faeces-like | SA | 2484 | 1388 |
| 44) | phenylacetic acid | 103-82-2 | honey-like | HS, SA | 2551 | 1262 |
| 45) | vanillin | 121-33-5 | vanilla-like | HS, SA | 2569 | 1404 |
| 46) | 5α-androst-16-en-3α-one | 18339-16-7 | urine-like, animalic | SA | >2600 | Nd |

[a]The compounds were identified by comparing it with the reference odorant based on the following criteria: retention indices on the capillaries named in the table, mass spectra obtained by MS/EI and MS/CI, odor quality and intensity perceived at the sniffing port.
[b]Odor quality perceived at the sniffing port.
[c]Sampling technique: HS: HRGC-Olfactometric detection of odorants via PDMS bar - headspace sampling, SA: HRGC-Olfactometric detection of odorants via direct stir bar sorptive extraction of the milk sample.
[d]Retention indices were calculated according to Halang WA, Langlais R, Kugler E. Anal. Chem. 1978, 50: 1809-1832.

Characterization Odor-Active Compounds Via Direct Stir Bar Sorptive Extraction of Human Milk Samples HRGC-olfactometric analysis of the adsorbed volatiles from direct extraction of human milk led to the identification of the same compounds discussed above (cf. Table 1). Apart from that, 25 additional compounds were detectable by means of HRGC-O. Only seven of these were detectable in all human milk samples from all donors: the peach-like smelling (Z)-6-γ-dodecenolactone, the fatty smelling (E,E)-deca-2,4-dienal, and the citrussy-soapy smelling compounds nonanal and decanal. Interestingly, the other three of these seven odorants elicited for adults relatively objectionable, animalic odors: the goat-like smelling 4-ethyloctanoic acid, an unidentified musty smelling odorant, as well as the urine-like smelling 5α-androst-16-en-3α-one.

Additional compounds were the faeces-like smelling 3-methylindole, the intensely sweaty 2- and 3-methylbutanoic acids and pentanoic acid, and an additional unidentified goat-like compound. These odorants were, however, not sensorically detectable in all milk samples. The remaining compounds were also not detectable in all milk samples, but only a few of them. These were the fatty and cucumber-like smelling odorants (E,E)-octa-2,4-dienal and (E,Z)-nona-2,6-dienal, and the mushroom-like smelling non-1-en-3-one. Other for adults relatively pleasant odor notes originated from the flowery compounds linalool and β-ionone, the sweet smelling 2-aminoacetophenone and δ-dodecalactone, and two honey-like odorants (phenylacetaldehyde and 2-phenylethanol). Characteristic bellpepper-like, phenolic and savory-like impressions were elicited by 3-isobutyl-2-methoxypyrazine, 2-methoxyphenol, and sotolon, while one metallic smelling compound remained unidentified.

In the present invention, a broad variety of odor-active substances was identified in human milk samples. It was shown that not only a large number of compounds can be found, but that these odorants are structurally very diverse, and exhibit an array of different olfactory impressions. It was also shown that most of these substances were detectable either by means of headspace analysis or by direct SBS extraction of the milk samples. For this reason these compounds are characteristic constituents of human milk.

Comparing the results presented here with those of Bingham et al. (Bingham P M, Stevens-Tuttle D, Lavin E, Acree T. Arch. Pediatr. Adolesc. Med. 2003, 157: 1031) who analyzed four breast milk samples, it can be seen that the fatty smelling (E)-non-2-enal, the mushroom-like smelling oct-1-en-3-one and the caramel-like smelling 4-hydroxy-2,5-dimethyl-3 (2H)-furanone were in both studies among those compounds which were detectable in all milk samples. However, diacetyl and methional which were only found in formula milk in the previous study, were identified as human milk odorants in the present application, together with more than 30 additional odorants which had not been reported by Bingham et al.

More than 50% of these odorants were even detectable just in the headspace of the human milk samples, without the need for a direct milk extraction methodology. This displays the high sensitivity and selectivity of the applied analytical procedure. On the other hand, those compounds which were additionally detected by direct SBS extraction of the milk samples were odorants with relatively high molecular weight, such as 5α-androst-16-en-3α-one or (Z)-6-γ-dodecenolactone. Often they were homologues with higher molecular weights of related substances already detected by headspace analysis. For example, hexanal and octanal were identified by means of headspace analysis while nonanal and decanal were additionally found by the direct extraction procedure. This mirrors discrimination effects of the headspace technique due to volatility aspects, and highlights the need to use the direct extraction technique as complementary tool.

The detection of the steroid compound 5α-androst-16-en-3α-one as sensorically active constituent using the presented SBSE procedure is noteworthy. On the other hand, maltol and 2-nonanone were not detected in our study by means of HGRC-O after SBSE enrichment. It is difficult to speculate about the reasons for these differences as details on the exact experimental procedure have not been provided in the previous study (Bingham P M, Stevens-Tuttle D, Lavin E, Acree T. Arch. Pediatr. Adolesc. Med. 2003, 157: 1031). While it has been specified that analysis and identification had been performed by means of gas chromatography-olfactometry, and had also been based on the respective odorant retention indices, no details have been given on the mode of odorant enrichment or recovery. In this context, it needs to be stated that only those compounds were taken into consideration within the present invention which were detectable by means of HRGC-O, but not HRGC-FID or HRGC-MS only. This has obviously been done accordingly in the study by Bingham et al. Therefore, the detection differences are very likely due to the fact that another sample work-up procedure has been used, such as solvent extraction and/or a distillation approach.

Generally, it has to be noted that maltol and 2-nonanone are not very potent odorants. Comparison with previous results on SBSE application in the determination of trace aroma compounds in physiological context implies that this approach is a highly sensitive, and a useful complementary tool for identification of odorants in small-scale samples. This is affirmed by the present study with the first-time characterization of large number of human milk odorants. This shows that the applied technique can be used as a screening system for potent odorants in small-scale human milk samples. For selective and sensitive quantitation the presented technique can be used as basis for e.g. stable isotope dilution assays as described elsewhere.

REFERENCES

[1] Jackson K M, Nazar A M. *J. Am. Osteopath. Assoc.* 2006; 106: 203-207.
[2] German J B, Dillard C J, Ward R E. *Curr. Opin. Clin. Nutr. Metab. Care* 2002, 5: 653-658.
[3] Lonnerdal B. *Nutrition* 2000, 16: 509-511.
[4] Makin J W, Porter R H. *Child Developm.* 1989, 60: 803-810.
[5] Marlier L, Schaal B, Soussignan R. *C. R. Acad. Sci. Paris* 1997, 320: 999-1005.
[6] Marlier L, Schaal B. *Child Developm.* 2005, 76: 155-168.
[7] Mennella J A, Beauchamp G K. *Pediatrics* 1991, 88: 737-744.
[8] Mennella J A, Beauchamp G K. *Pediatric Res.* 1997, 41: 188-192.
[9] Mennella J A, Jagnow C P, Beauchamp G K. *Pediatrics* 2001, 107: E88.
[10] Mennella J A, Griffin C E, Beauchamp G K. *Pediatrics* 2004, 113: 840-845.
[11] Porter R. *Physiol. Behav.* 1991, 50: 907-911.
[12] Soussignan R, Schaal B, Marlier L, Jiangs T. *Physiol. & Behavior* 1997, 62: 745-758.
[13] Christensen K, Reineccius G. *J. Dairy Sci.* 1992, 75: 2098-2104.
[14] Vazquez-Landaverde P, Velazquez G, Torres J, Qian M. *J. Dairy Sci.* 2005, 88: 3764-3772.
[15] Weidong M, Clement B, Klemm W. *J. Dairy Sci.* 1997, 80: 3227-3233.
[16] Moio L, DeKimpe J, Etievant P, Addeo F. *J. Dairy Res.* 1993, 60: 199-213.
[17] Moio L, Langlois D, Etievant P, Addeo F. *J. Dairy Res.* 1993, 60: 215-222.
[18] Moio L, DeKimpe J, Etievant P, Addeo F. The neutral volatile compounds of water buffalo milk. Ital. *J. Food Sci.* 1993, 1: 43-56.
[19] Moio L, Rillo L, Ledda A, Addeo F. *J. Dairy Sci.* 1996, 79: 1322-1331.
[20] Ramaswamy N, Baer R, Schingoethe D, Hippen A, Kasperson K, Whitlock L. *J. Dairy Sci.* 2001, 84: 2144-2151.
[21] Desage M, Schaal B, Soubeyrand J, Orgeur P, Brazier J L. Gas chromatographic-mass spectrometric method to characterise the transfer of dietary odorous compounds into plasma and milk. *J. Chromatogr. B. Biomed. Appl.* 1996, 678: 205-10.
[22] Bingham P M, Stevens-Tuttle D, Lavin E, Acree T. *Arch. Pediatr. Adolesc. Med.* 2003, 157: 1031.
[23] Shimoda M, Yoshimura T, Ishikawa H, Hayakawa I, Osajima Y. *J. Fac. Agric. Kyushu Univ.* 2000, 45 (1): 199-206.
[24] Main M, Mortensen G, Kaleva M, Boisen K, Damgaard I, Chellakooty M, Schmidt I, Suomi A, Virtanen H, Petersen J, Andersson A, Toppari J, Skakkebaek N. *Environm. Health Perspect.* 2006, 114: 270-276.
[25] Pronczuk J, Akre J, Moy G, Vallenas C. *Environm. Health Perspect.* 2002, 110: A349-351.
[26] Baltussen E, Sandra P, David F, Cramers C. *J. Microcol.* September 1999, 11: 737-747.
[27] Baltussen E, Cramers C A, Sandra P. *Anal. Bioanal. Chem.* 2002, 373: 3-22.
[28] Vercauteren J, Pérès C, Devos C, Sandra P, Vanhaeke F, Moens L. *Anal. Chem.* 2001, 73: 1509-1514.
[29] Popp P, Bauer C, Wennrich L. *Anal. Chim. Acta* 2001, 436: 1-9.
[30] Tredoux A, Lauer H, Heideman T, Sandra P. *J. High Resol. Chromatogr.* 2000, 23: 644-646.
[31] Sandra P, Tienpont B, Vercammen J, Tredoux A, Sandra T, David F. *J. Chromatogr. A* 2001, 928: 117-126.
[32] Kreck M, Püschel S, Wüst M, Mosandl A. *J. Agric. Food Chem.* 2003, 51: 463-469.
[33] Bicchi C, Iori C, Rubiolo P, Sandra P. *J. Agric. Food Chem.* 2002, 50: 449-459.
[34] Nakamura S, Nakamura N, Ito S. *J. Sep. Sci.* 2001, 24: 674-677.
[35] Ochiai N, Sasamoto K, Takino M, Yamashita S, Daishima S, Heiden A, Hoffman A. *Analyst* 2001, 126: 1652-1657.
[36] Kreck M, Scharrer A, Bilke S, Mosandl A. *Eur. Food Res. Technol.* 2001, 213: 389-394.
[37] Benijts T, Vercammen J, Dams R, Pham-Tuan H, Lambert W, Sandra P. *J. Chromatogr. B* 2001, 755: 137-142.
[38] Tienpont B, David F, Desmet K, Sandra P. *Anal. Bioanal. Chem.* 2002, 373: 46-55.
[39] Buettner A. Detection of analytes in a defined area of the body. WO2005/024389.
[40] Buettner A, Welle F. *Flavour Fragr. J.* 2004, 19: 505-514.
[41] Buettner A, in T. Hofmann, T. Rothe, P. Schieberle, (Eds.), State-of-the-Art in Flavour Chemistry and Biology, Proceedings of the $7^{th}$ Wartburg Symposium on Flavor Chemistry & Biology. Eigenverlag Deutsche Forschungsanstalt für Lebensmittelchemie, Garching, 2005; p. 387.
[42] Buettner A. *J. Agric. Food Chem.* 2004, 52: 2339-2346.
[43] Griess M, Buettner A. in preparation.
[44] Halang W A, Langlais R, Kugler E. *Anal. Chem.* 1978, 50: 1809-1832.
[45] Schieberle P, Grosch W. *Z. Lebensm. Unters. Forsch.* 1991, 192: 130-135.
[46] Blank I, Fischer K H, Grosch W. *Z. Lebensm. Unters. Fosch.* 1989, 189: 426-433.
[47] Ullrich F, Grosch W. *J. Am. Oil Chem. Soc.* 1988, 65: 1313-1317.
[48] Ullrich F, Grosch W. *Fat Sci. Technol.* 1988, 90: 332-336.
[49] Rota V. *Charakterisierung von Schlüsselaromastoffen in rohem and gekochtem Schaffleisch durch Anwendung von Struktur/Wirkungskonzepten.* PhD thesis, Technical University Munich, Germany, Verlag Dr. Hut, Muenchen, Germany, 2004.
[50] Buettner A, Schieberle P. *J. Agric. Food Chem.* 2001, 49: 1358-1363.
[51] Schieberle P. New developments on methods for analysis of volatile flavor compounds and their precursors. In Gaonkar, A. G. (ed.), *Characterization of Food-Emerging Methods.* Elsevier, Amsterdam, 1995, pp. 403-433.

We claim:

1. A nutraceutical composition for newborns or babies excluding whole human breast milk comprising,
an infant formula or infant food,
said infant formula or infant food including at least one odorant selected from the group consisting of methylpropanal, 1-hexen-3-one, (Z)-1,5-octadien-3-one, nonanal, non-1-en-3-one, acetic acid, 3-methylthio propanal (methional), decanal, (Z)-non-2-enal, 3-isobutyl-2-methoxypyrazine, (E)-non-2-enal, linalool, (E,Z)-nona-2,6-dienal, (E,E)-octa-2,4-dienal, butanoic acid, phenylacetaldehyde, 2/3-methylbutanoic acid, pentanoic acid, 2-methoxyphenol (guaiacol), 2-phenylethanol, β-ionone, trans-(4,5)-epoxy-(E)-dec-2-enal, 4-hydroxy -2,5-dimethyl-3(2H)-furanone, γ-nonalactone, γ-decalactone, 4-ethyloctanoic acid, δ-decalactone, 3-hydroxy-4,5-dimethyl-2(5H)-furanone (sotolon), 2-aminoacetophenone, (Z)-6-γ-dodecenolactone, 3-methylindole (skatol), phenylacetic acid, 5α-androst -16-en-3-one, 4,16-androstadien-3-one, 1,4-androstadien-3,17-dion and mixtures thereof;

at least one compound selected from the group consisting of hexanoic acid, heptanoic acid, octanoic acid, nonanoic acid, decanoic acid, 3-methyl-2-hexenoic acid, δ-octalactone, γ-octalactone, δ-nonalactone, γ-dodecalactone, 4,16-androstadien -3-one, 1,4-androstadien-3,17-dione, ethyl isobutanoate, ethyl butanoate, ethyl 2-methyl butanoate, ethyl 3-methylbutanoate, ethyl hexanoate, and ethyl octanoate; and an odorant selected from the group consisting of 5α-androst-16-en-3-one, 4,16-androstadien-3-one, and 1,4androstadien-3,17-dione.

2. A nutraceutical composition according to claim 1, wherein the infant formula or infant food comprises at least 4 odorants selected from the group consisting of 1-hexen-3-one, (Z)-1,5-octadien-3-one, non-1-en-3-one, phenylacetaldehyde, β-ionone, trans-(4,5)-epoxy-(E)-dec-2-enal, γ-nonalactone, γ-decalactone, 4-ethyloctanoic acid, δ-decalactone, 3-hydroxy-4,5-dimethyl-2(5H)-furanone (sotolon), 2-aminoacetophenone, (Z)-6-γ-dodecenolactone, 3-methylindole (skatol), phenylacetic acid, 5α-androst-16-en-3-one, 4,16-androstadien-3-one, and 1,4-androstadien-3,17-dione.

3. A nutraceutical composition according to claim 1, wherein the nutraceutical composition comprises the infant formula, and wherein the infant formula improves the acceptance of the nutraceutical composition by babies and newborns.

\* \* \* \* \*